(No Model.)
J. O. RUSBY.
RELIEF VALVE.
No. 347,892. Patented Aug. 24, 1886.
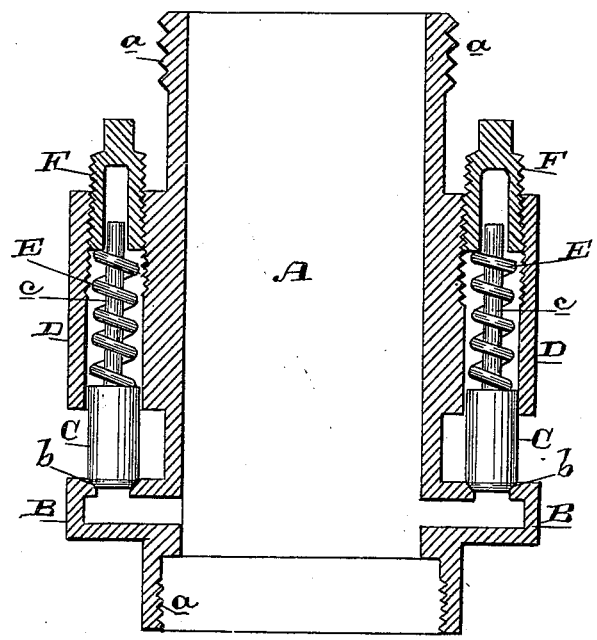
Witnesses,
Geo. H. Strong
J. H. Rouse
Inventor,
Jas. O. Rusby.
By Dewey & Co.
atty

UNITED STATES PATENT OFFICE.

JAMES O. RUSBY, OF CHICO, CALIFORNIA.

RELIEF-VALVE.

SPECIFICATION forming part of Letters Patent No. 347,892, dated August 24, 1886.

Application filed July 6, 1886. Serial No. 207,279. (No model.)

*To all whom it may concern:*

Be it known that I, JAMES O. RUSBY, of Chico, Butte county, State of California, have invented an Improvement in Relief-Valves; and I hereby declare the following to be a full, clear, and exact description of the same.

My invention relates to a new and useful relief-valve for fire or other hose, the object of which is to prevent the hose from bursting when the nozzle is closed or when there is any obstruction to the stream.

My invention consists in a short section of pipe provided with means at each end for readily coupling it to the sections of hose at any portion thereof, said pipe having formed upon each side a hollow lug in which is made a valve-seat, said lug communicating with the interior of the pipe. On each side of the pipe, and directly above the lugs in which the valve-seats are formed, are perforated lugs, in which the stem of the valves, which are seated in the valve-seats below, are fitted, said lugs being internally threaded to receive a gland-nut, which presses upon a spring encircling the valve-stems, all of which I shall hereinafter fully describe by reference to the accompanying drawing, in which the figure is a vertical section of my relief-valve.

A is a short section of pipe, having at each end the threaded portions $a$, by which it is adapted to be let into the hose at any point desired. Upon the sides of the pipe, near one end, are formed lugs B, which are hollow or chambered out, and communicate with the interior of the pipe. In the tops of these lugs are formed the valve-seats $b$, in which the longitudinally-operating valves C are seated. Upon the pipe A are also formed the lugs D, which are perforated to receive the stems $c$ of the valves, and also a spring, E, which bears with its lower end upon a shoulder formed on the valve. The upper portion of the sockets in the lugs D is internally threaded to receive the externally-threaded gland-nuts F, the lower ends of which press on the tops of the springs, whereby they are compressed and the valves held in their seats.

The operation of my relief-valve is as follows: It can be let into the hose at any desired point. When the nozzle is closed, or when from any cause the stream is cut off at a point beyond the relief-valve and has a tendency by the pressure to burst the hose, this pressure is sufficient to force the spring-actuated valves C slightly from their seats, thus relieving the hose. The valves accommodate themselves in their movement to the pressure, and relieve it only to the extent desired, so that the hose will not burst, the springs to this end being made strong enough, and their tension adjusted by the gland-nuts, so that the valves will not yield except to undue pressure.

Having thus described my invention, what I claim as new, and desire to secure by Letters Patent, is—

1. The pipe adapted to be let into a hose at any suitable point, and having the hollow lugs B on each side communicating with the interior of the pipe, and provided with valve-seats, in combination with the spring-actuated valves secured to the sides of the pipe, and seated in the valve-seats of the hollow lugs, substantially as herein described.

2. The pipe A, adapted to be let into the hose at any suitable point, and having the hollow lugs B on each side communicating with the interior of the pipe, and provided with valve-seats $b$, and the perforated lugs D on each side of said pipe, in combination with the spring-actuated valves C, operating in the valve-seats of the lugs B, and having their stems seated in the perforated lugs D, substantially as herein described.

3. The pipe A, adapted to be let into the hose at any suitable point, and having the perforated lugs B communicating with the interior of the pipe, said lugs having seats $b$, and the perforated lugs D on the sides of the pipe, in combination with the valves C, operating in the valve-seats of the lugs B, and having their stems $c$ fitted in the perforated lugs, the springs E within said lugs, and around and actuating the valve-stems, and the gland-nuts F, fitted in the lugs and bearing on the springs, substantially as herein described.

In witness whereof I have hereunto set my hand.

JAMES O. RUSBY.

Witnesses:
THOMAS WALSH,
HENRY F. STACKPOLE.